United States Patent [19]

Peperone

[11] 4,205,316
[45] May 27, 1980

[54] ENHANCED ACCURACY DOPPLER FUZE

[75] Inventor: Salvador J. Peperone, Silver Spring, Md.

[73] Assignee: The United States of America as represented by the Secretary of the Army, Washington, D.C.

[21] Appl. No.: 624,671

[22] Filed: Mar. 16, 1967

[51] Int. Cl.$^2$ .......................... G01S 9/24; F42C 13/04
[52] U.S. Cl. .................................. 343/14; 343/7 PF; 102/214
[58] Field of Search .................. 343/14, 17.2, 12 A, 343/17.2 PC, 7 PF; 102/70.2 P, 214

[56] References Cited

U.S. PATENT DOCUMENTS

| | | | |
|---|---|---|---|
| 3,068,471 | 12/1962 | Erst | 343/14 |
| 3,109,172 | 10/1963 | Hardinger et al. | 343/14 |
| 3,173,138 | 3/1965 | Erst | 343/14 |
| 3,229,286 | 1/1966 | Samuel et al. | 343/17.2 X |
| 3,363,248 | 1/1968 | Nicodemus | 343/17.2 |

FOREIGN PATENT DOCUMENTS 536069  1/1957 Canada .................................. 343/14

Primary Examiner—T. H. Tubbesing
Attorney, Agent, or Firm—Nathan Edelberg; Robert P. Gibson; Saul Elbaum

[57] ABSTRACT

An FM-CW radar distance measuring system and a method for reducing the ambiguity and enhancing the accuracy in said system. The system disclosed utilizes three triangular wave modulators which modulate the RF output of the transmitter. The target return signal is mixed with a portion of the transmitted signal which has been delayed by an amount of time equal to the time required for a signal to travel to the target and return. This mixed signal is filtered to select the doppler component, and this component is amplified to utilize range information.

6 Claims, 3 Drawing Figures

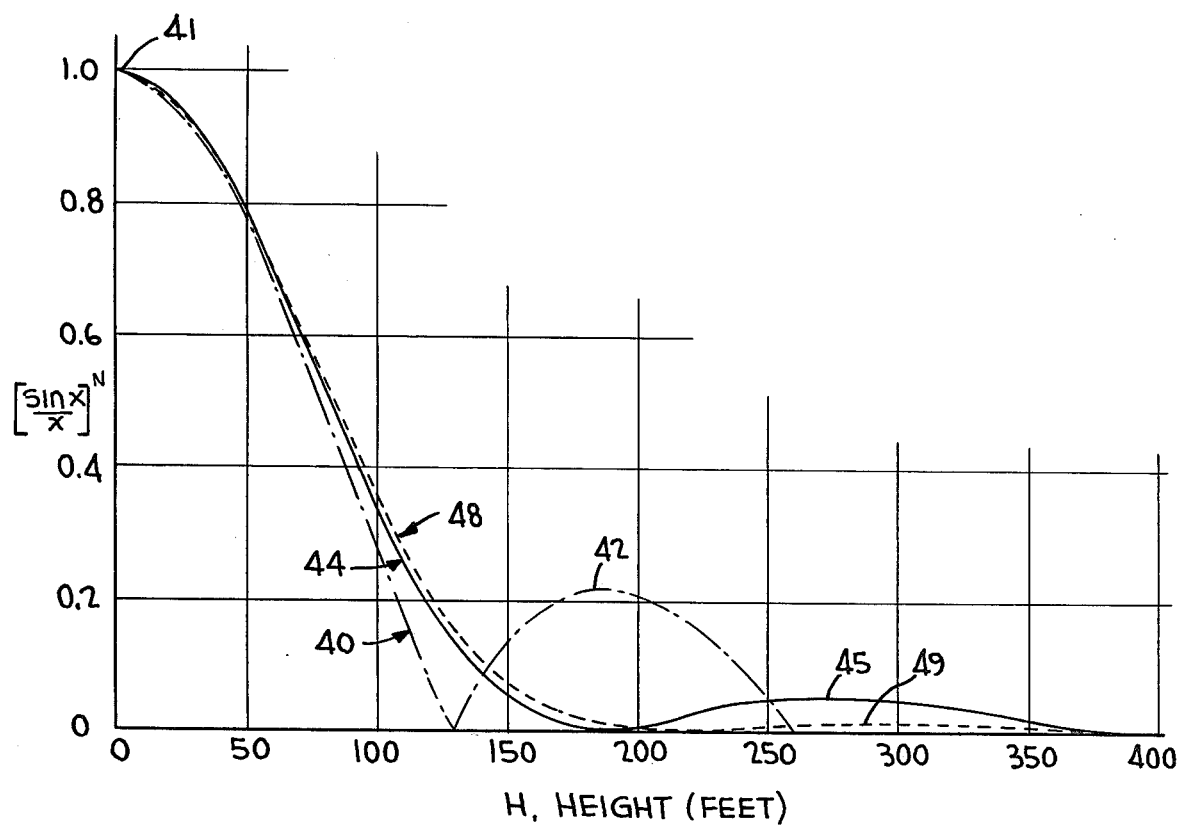

ENHANCED ACCURACY DOPPLER FUZE

Frequency modulated continuous wave radar distance measuring systems generally utilize either sine wave or triangular wave modulation in the transmitted signal and that signal is radiated toward potential targets. The received target return signal will have a frequency at the instant of reception which will differ from the transmitted frequency by an amount determined by the time required for the signal to travel to the target and return, the modulation frequency, and the frequency deviation of the carrier signal. Frequently, FM-CW distance measuring systems are used in applications where the target and measuring system are in motion relative to each other. This, of course, will generate a doppler frequency component, in addition to those mentioned above, and in such systems the doppler component of the target return signal may be used to provide distance information.

The FM-CW distance measuring system herein described is intended to be used in proximity fuzes. However, its utility is not limited to that application, and it is foreseen that this distance measuring system might be used in many other areas, such as radar altimeters. In proximity fuzes, the modulation waveform is characteristically a sine wave or a triangular wave, and the envelope of the resultant doppler component essentially conforms to a sin x/x curve where x is proportional to range to target. Generally, the amplitude of the sin x/x curve is utilized to indicate when a given distance is reached at which the projectile on which the fuze is mounted will fire. As is well known the sin x/x curve includes a number of secondary maxima in addition to the primary peak. In some instances a secondary maximum for a strong target might have an amplitude approaching that of the primary peak for a weak target. This can materially impair the system's ability to resolve the target which might result in premature firing of the projectile.

It has been demonstrated in U.S. Pat. No. 3,068,471 to S. J. Erst that by introducing a second non-synchronized sinusoidal modulating signal the unwanted secondary peaks may be suppressed, and by selection of other sum and difference frequency components at the output of the mixer other unwanted range response peaks may be suppressed or desired peaks accentuated. However, it is known in the art that a single triangular modulating waveform is more desirable than a single sinusoidal modulating wave, because this results in lower secondary peaks. Nevertheless because of the extreme difficulty experienced in the past with the theoretical analysis of multiple-modulated signals, performance characteristics for multiple triangular modulating waveforms could not be predicted, and therefore, this modulation technique has not been previously used. This is true even though single triangular wave modulating signals were used in many of the earliest radar distance measuring systems. Now, however, more recent work resulting in the discovery of new computational techniques has revealed a much simpler method of analysis and has led to a much better understanding of FM-CW range measuring techniques, especially thse involving triangular modulating waveforms.

The object of this invention is to provide an FM-CW distance measuring system having all the advantages inherent in such systems but yielding range information with reduced ambiguity and enhanced accuracy while utilizing simpler circuitry.

I have discovered that the foregoing object and advantages can be attained economically and effectively through the use of multiple periodic linear modulating waveforms of different and unrelated frequencies, in lieu of modulating waveforms that have been used in the prior art. I have discovered, and am able to demonstrate both theoretically and practically, that systems in accordance with my invention reduce undesired target-return signals by a significant amount. My invention by providing this very surprising and unobvious result meets an important and long-felt need in the fuzing and distance measuring art.

The aforementioned and other objects and features of my invention and the method of achieving them will be more apparent upon reference to the following description taken in conjunction with the drawings wherein:

FIG. 2b is a curve of the theoretical range law of a FM-CW distance measuring system with triangular wave modulation.

Figure 1:
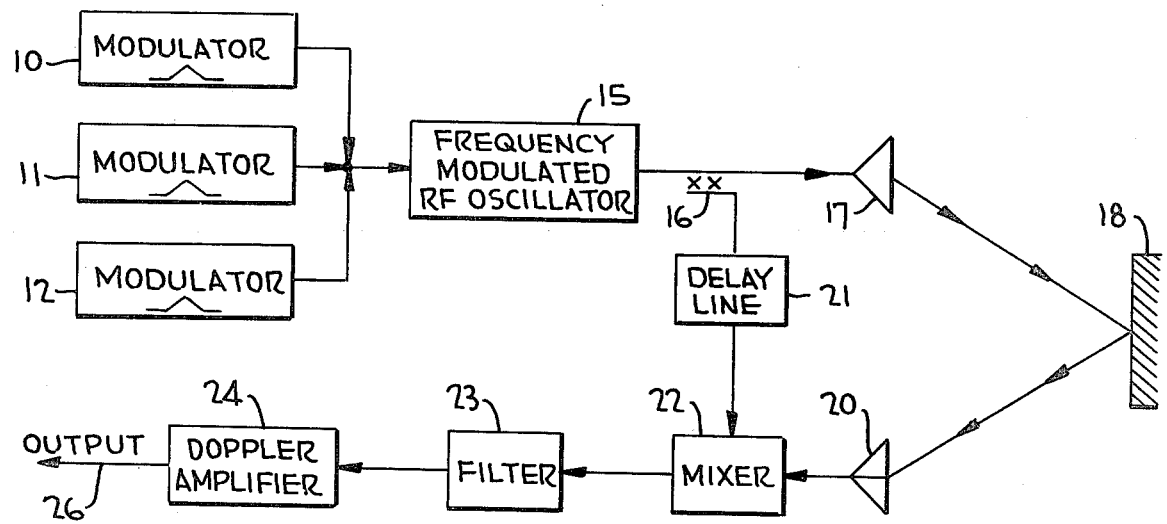
FIG. 1 is a block diagram of a typical embodiment of this invention.

Referring to FIG. 1, modulators 10, 11, and 12 asynchronously generate triangular wave signals of different frequencies which are applied as frequency modulation signal to an R. F. oscillator 15. The triangular wave generators may be one of the many well known types, which are generally simple, easily implemented circuits, thus decreasing the cost and complexity of FM-CW distance measuring systems. It should be noted that prior art circuits contain only one modulator, with a variety of waveforms being used or, as in the case of the above-mentioned Erst patent, a plurality of sinusoidal modulators. The R. F. oscillator may be one of the conventional types, such as an L-band magnetron. The resultant frequency modulated signal is coupled to a transmitting antenna 17 from which it is radiated toward potential targets, such as target 18. A portion of the transmitted signal is routed to a mixer 22 through a delay line 21 by a directional coupler 16. The delay line 21 in the reference channel has the effect of shifting the output signal 26 so that its envelope is a maximum when the target and reference delays are equal. In mixer 22, the reference signal and the received target return signal from receiving antenna 20 are combined. Filter 23 connected to the output of mixer 22 selects only the doppler component of the mixed signal for amplification by a doppler amplifier 24, the output of which may be utilized to provide range information. Often, it might be necessary to detect the doppler signal before it is used.

Figure 2A:
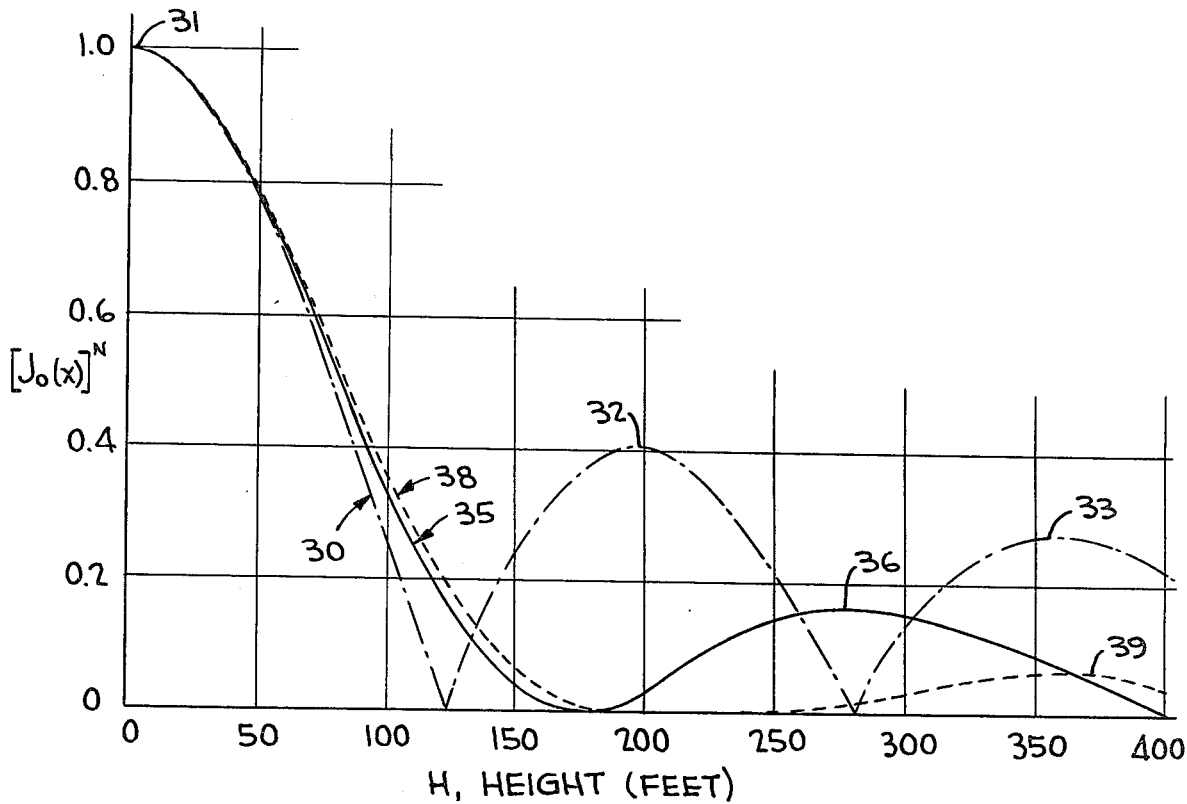
FIG. 2a is a curve of the theoretical range law of a FM-CW distance measuring system with sinusoidal modulation.

FIG. 2a depicts the theoretical results of sinusoidal modulation of an FM-CW distance measuring system. It should be noted that the curves illustrated both in FIGS. 2a and 2b would result from zero delay in the reference channel; that is, if delay line 21 was not present in the system shown in FIG. 1, the doppler output signal would have its maximum at zero range. For N modulators the envelope of the doppler component available at the output of mixer 22 (FIG. 1) will conform to the expression $[J_o(x)]^n$ which is a harmonic of the Bessel function expression obtained upon the expansion of the frequency modulated signal. The argument x may be obtained from the following expression:

$$X = (\sqrt{2}/N) \cdot (4\pi/C) \cdot \Delta F_{rms} \cdot H$$

where

N = number of signals modulating the carrier frequency $\Delta F_{rms}$ = rms deviation of the modulated signal which in this case is 1.1 MHz.

H = distance from the transmitter with zero delay in the reference channel P1 C = the velocity of light Curve 30 is a plot of the envelope of the Doppler component that might be obtained from doppler amplifier 24 which has a primary peak 31 at zero distance from the transmitter. Of particular interest is the secondary maximum 32 of this curve which is 0.4 of the value of the primary peak. Depending on the threshold of this signal chosen to actuate a fuze or the altitude desired to be determined it can be seen that the secondary peak 32 and a third peak 33 will significantly impair the resolution of the device. The situation is considerably improved by adding a second sinusoidal modulating signal which will produce an output curve 35. This curve also has a primary peak at 31, but it produces a reduced secondary peak 36 which has been suppressed to less than one-half the value of the secondary peak of output curve 30. Adding a third sinusoidal modulating signal will produce even more desirable results as depicted by curve 38, the secondary peak of which 39 is only 15 percent of the secondary peak produced by a single sinusoidal modulating signal. Theoretically, the suppression of secondary and further peaks of the output signal of a FM-CW distance measuring system will increase indefinitely with the addition of further modulating signals.

FIG. 2b illustrates the improved results obtained when triangular wave modulation is used in FM-CW distance measuring systems. It has been found that the doppler output signal of a system that has been modulated by a triangular waveform corresponds to a (sin x/x)$^N$ curve where:

$$X = (\sqrt{3}/N) \cdot (4\pi/C) \cdot \Delta F_{rms} \cdot H$$

and the symbols correspond to the symbols used in the expression describing the curve of FIG. 2a. Modulating with a single triangular waveform will produce curve 40, which has a primary peak 41 and a secondary peak 42. Comparing this curve with the curves of FIG. 2a, it can be seen that the use of triangular modulation in itself will produce better results in terms of the attenuation of the doppler output signal with range. It should be noted that the secondary peak 42 produced by triangular wave modulation is only slightly more than one-half the amplitude of the secondary peak produced by a single sinusoidal modulating signal. Even better results are produced by adding second and third triangular wave modulating signals as demonstrated by curves 44 and 48, respectively. Secondary peak 45 of curve 44 is approximately 30 percent of secondary peak 42 of curve 40, and in comparing it with secondary peak 36 produced by two sinusoidal modulating signals it will be seen that suppression of secondary peaks is improved by 70 percent. The results obtained by adding a third triangular wave modulating signal are further improved as demonstrated by secondary peak 49 of curve 48, which has an amplitude which is 20 percent of secondary peak 45 of curve 44 and is insignificant when compared to secondary peak 42 of curve 40. Upon comparison of curve 48 and curve 38, which was obtained by modulating with three sinusoidal signals, it can be seen that approximately 84 percent improvement in suppression of secondary peaks is effected.

While the illustrations of FIG. 2a and 2b are based on theoretical analysis, similar results have obtained in actual practice. In modulating a carrier in the L-band with three different and unrelated ultrasonic frequencies of equal amplitudes, it was found that modulating with triangular waveforms increased the attenuation of the first minor peak by a factor of about 18 db. over three equivalent sinusoidal modulating waveforms. Other minor peaks are reduced by even greater amounts.

It will be apparent that the embodiment described above is only exemplary and that various modifications in construction, arrangement, or the use of other linear modulation waveforms similar to the triangular waveform can be made by those skilled in the art within the scope of the invention as defined in the appended claims.

I claim as my invention:

1. A method of improving the resolution and accuracy of FM-CW radar distance measuring systems comprising the step of simultaneously modulating the carrier signal with each of a plurality of at least three asynchronous periodic linear wave signals.

2. A method of providing distance information comprising the steps of:
    (a) generating a plurality of at least three asynchronous periodic linear wave signals,
    (b) modulating a radio frequency oscillator simultaneously with each of said plurality of asynchronous periodic linear wave signals,
    (c) transmitting the output of said modulated radio frequency oscillator toward potential targets.
    (d) receiving a target return signal,
    (e) mixing said received signal with a portion of the transmitted signal,
    (f) selecting the doppler component of said mixed signal, and
    (g) utilizing said doppler component in any desired manner to provide distance information.

3. In a radar distance measuring system having a R. F. generator adapted to be frequency modulated which system transmits a frequency modulated continuous wave from said generator and extracts distance information from the target return signal by mixing the target return signal with a portion of the transmitted signal and selecting the doppler component of the mixed signal for utilization, the improvement comprising: a plurality of at least three sources of periodic linear modulating signals of different and unrelated frequencies, the outputs of each of said sources being connected to said generator to simultaneously frequency modulate said generator with each of said waveforms.

4. The improved FM-CW radar distance measuring system of claim 3 in which modulation is accomplished by a plurality of asychronously generated triangular wave signals of different frequencies.

5. A frequency modulated continuous wave radar distance measuring system of enhanced resolution and accuracy comprising:
    (a) a plurality of generators which produce periodic linear wave signals.
    (b) a radio frequency oscillator,
    (c) means connecting each of said plurality of generators to said radio frequency oscillator in order to simultaneously modulate the output of said radio frequency oscillator with the outputs of said plurality of generators, (d) means connected to the output of said radio frequency oscillator to radiate the frequency modulated signal toward potential targets, (e) a directional coupler adapted to pick up a portion of said frequency modulated signal, (f) a mixer with a first input connected to the output of said directional coupler and a second input connected to receive the target return signal, (g) a filter connected to the output of said mixer to select the doppler component of the mixed signal, (h) amplification and utilization means connected to the output of said filter to produce distance information in the desired manner.

6. The improved FM-CW radar distance measuring system of claim 5 including a delay line connected between said output of said directional coupler and said first input of said mixer whereby said portion of the frequency modulated signal is delayed by an amount equal to the time required for said frequency modulated signal to reach and return from the target.

* * * * *